United States Patent [19]

Nelson

[11] 4,097,085
[45] Jun. 27, 1978

[54] TRACTOR

[75] Inventor: Arnold Eugene Nelson, Havre, Mont.

[73] Assignee: Harmon's Northern Mfg., Inc., Havre, Mont.

[21] Appl. No.: 713,102

[22] Filed: Aug. 10, 1976

[51] Int. Cl.² ........................................... B62D 27/00
[52] U.S. Cl. .................................... 296/28 C; 62/244;
 280/152 R; 280/759; 296/63
[58] Field of Search .............. 296/28 C, 63; 280/759,
 280/152 R, 154.5 R; 297/330, 346; 248/416;
 180/944, 946, 77 TC, 77 C, 89.12, 89.13, 89.14;
 62/244; 181/33 K

[56] References Cited

U.S. PATENT DOCUMENTS

| 2,320,596 | 6/1943 | Henney | 62/244 |
| 3,086,794 | 4/1963 | Garrett | 280/152 R |
| 3,088,537 | 5/1963 | Tourneau | 180/89.12 |
| 3,517,941 | 6/1970 | Lazzeroni | 280/759 |
| 3,601,212 | 8/1971 | Peterson | 180/9.44 |
| 3,645,349 | 2/1972 | Nichter | 280/759 |
| 3,776,358 | 12/1973 | Williams | 296/28 C |
| 3,923,114 | 12/1975 | Suzuki | 181/33 K |
| 3,933,216 | 1/1976 | Irwin | 180/89.12 |
| 4,014,507 | 3/1977 | Swenson | 248/416 |

Primary Examiner—Joseph F. Peters, Jr.
Assistant Examiner—John A. Carroll
Attorney, Agent, or Firm—Burton & Dorr

[57] ABSTRACT

An improved tractor having a front section pivotally coupled to a rear section wherein the front section has a radiator, front wheels, and a tiltable cab. Wrapped around the radiator at the extreme end of the front section is a combination bumper and storing area for hydraulic fluid. The additional weight of the hydraulic storing area in front of the radiator substantially prevents front wheel slippage. Also mounted on the front section is a tiltable cab having air conditioning and a pedestal chair seating the operator. The air conditioning system is designed to force air from both a forward intake and a rearward intake between the top of the cab and a dome-shaped roof having a plurality of holes formed therein for uniformly distributing the air from the front and rear conditioners over the operator. The pedestal chair is designed to have forward and rearward movement as well as pivotal movement. Upwardly extending on one side of the chair from the pedestal is an arcuate support carrying the fluid power cables and terminating in an arm rest having hydraulic controls disposed in the front thereof. The front and rear sections of the tractors are designed to be of equal distance from the center coupler so that perfect tracking of the rear wheel in the paths of the front wheels is accomplished. Finally, the fenders of the tractor are designed to have mud balls substantially eliminated from forming thereunder.

21 Claims, 12 Drawing Figures

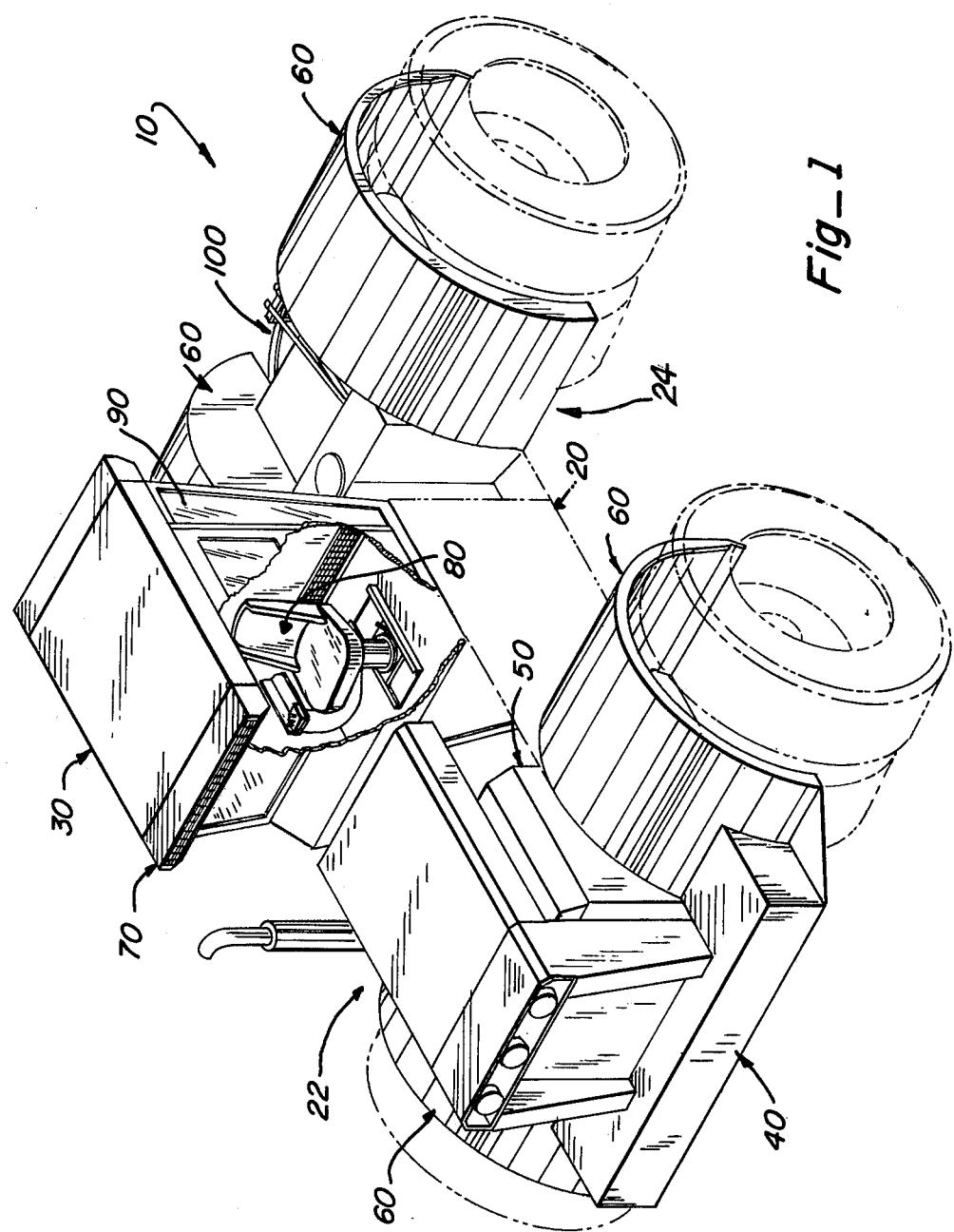
Fig_1

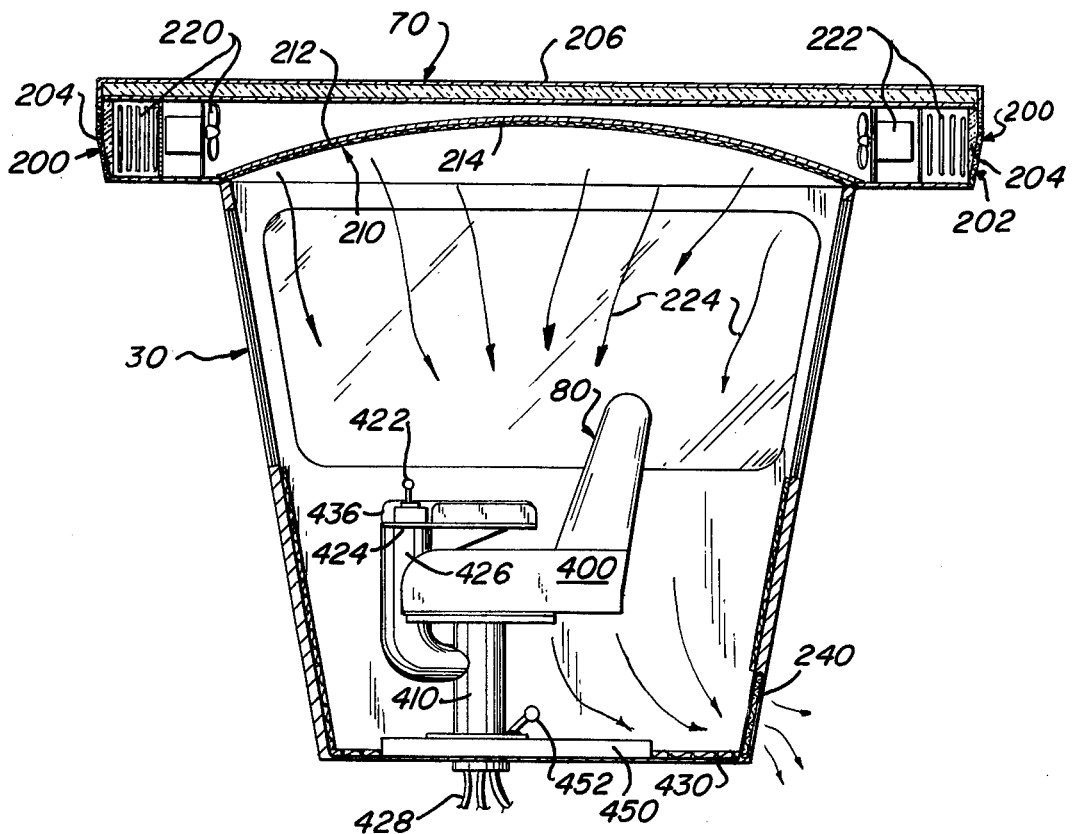
Fig_2
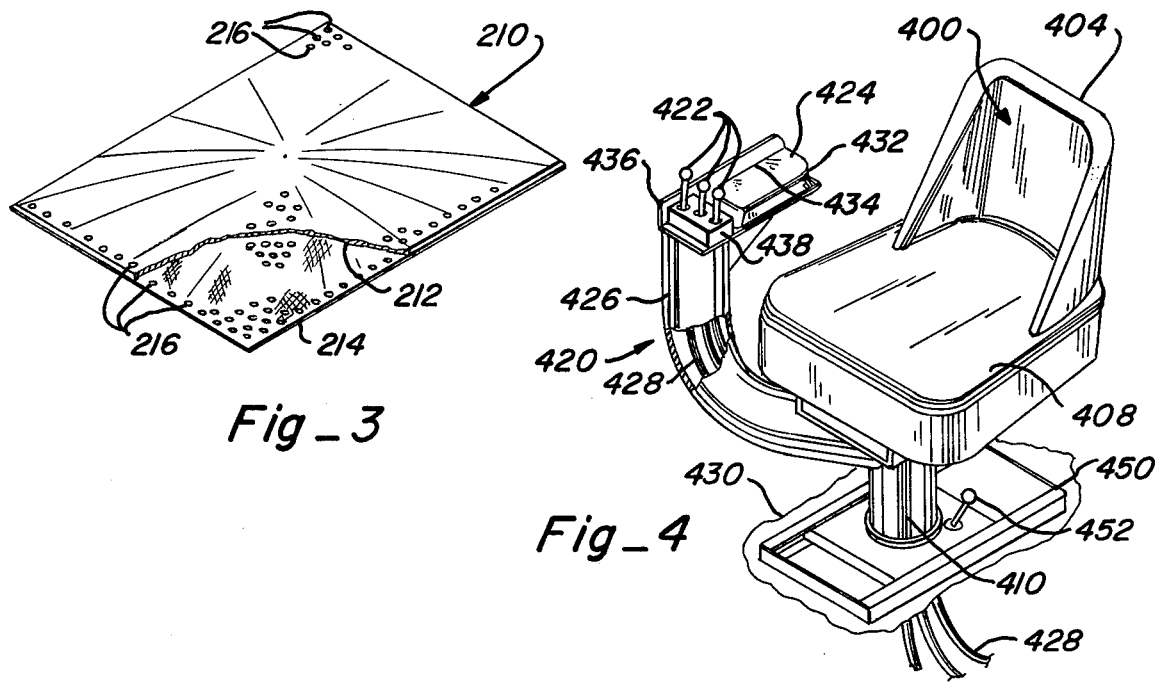
Fig_3
Fig_4

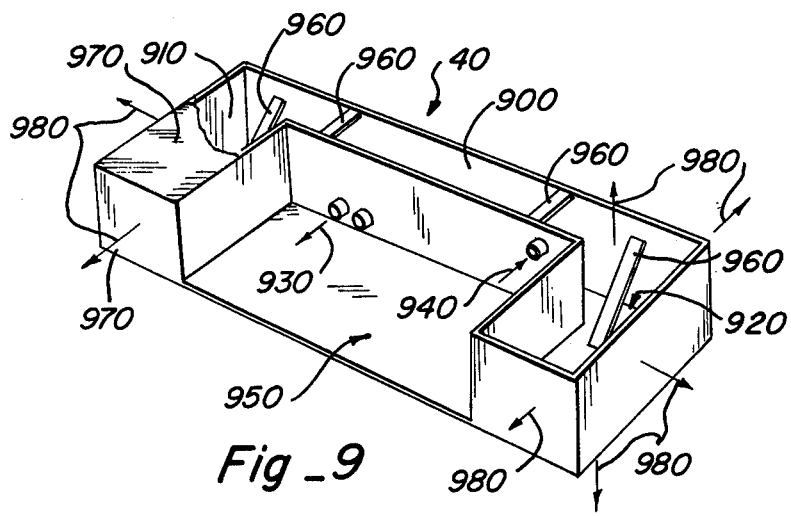
Fig_9
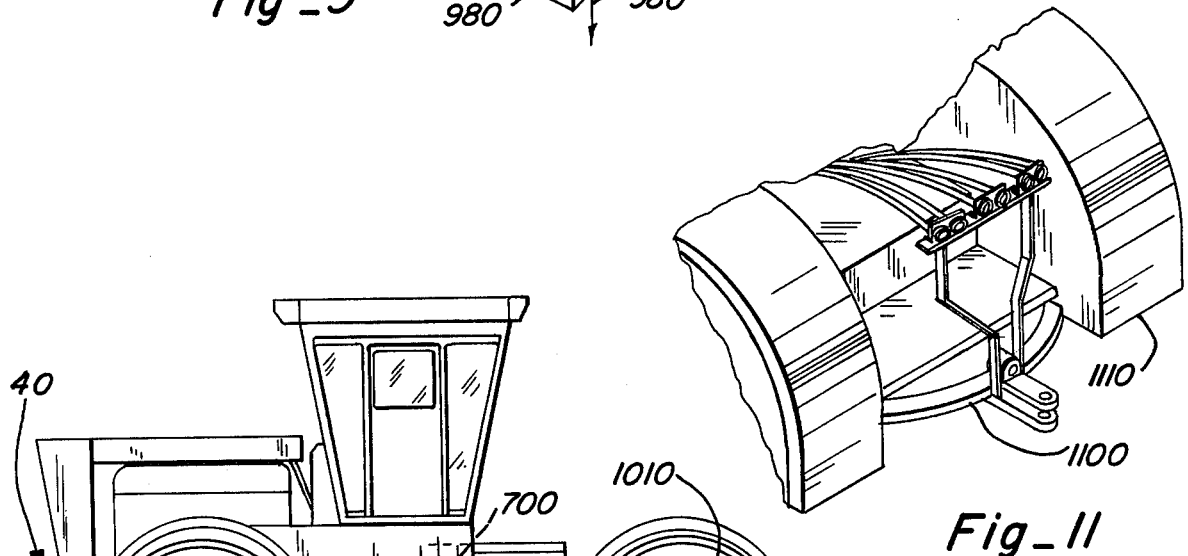
Fig_11
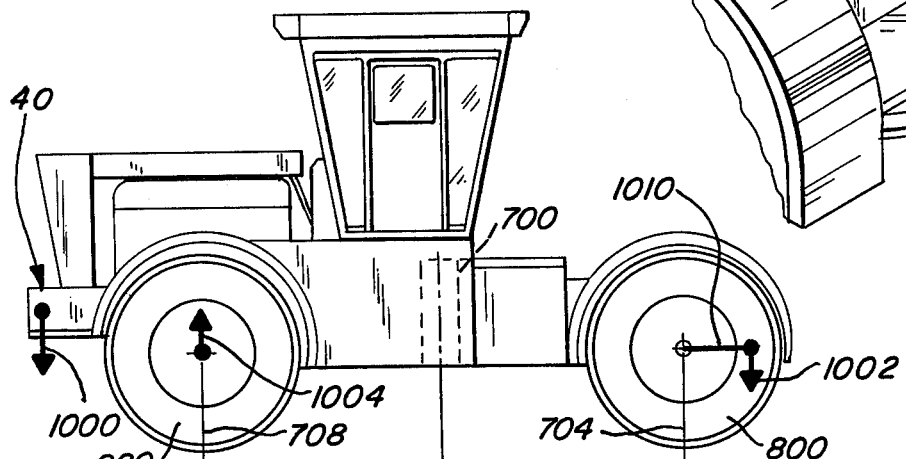
Fig_10
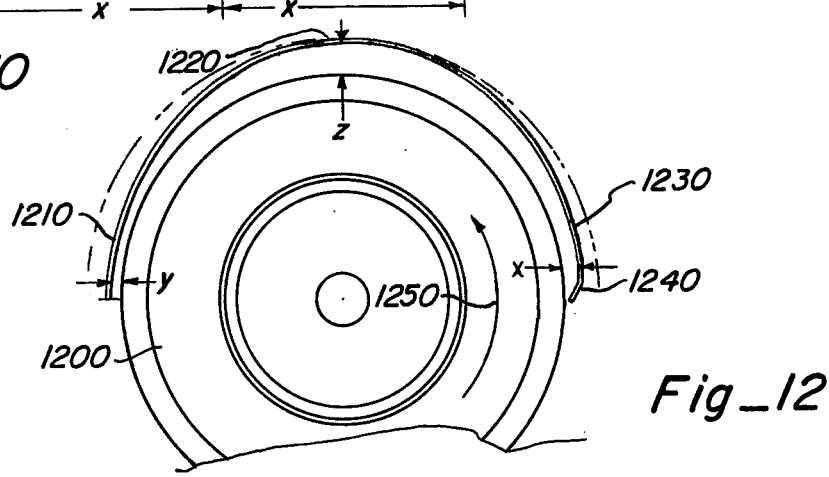
Fig_12

TRACTOR

BACKGROUND OF THE PRIOR ART

1. Field of the Invention

The present invention relates generally to agricultural tractors and more particularly to bifurcated tractors having four wheel drive.

2. Description of the Prior Art

Prior art tractors have been primarily designed as unitary frame constructions having the front and rear wheels mounted upon only a single frame. Such tractors generally are two-wheel drive vehicles having the power delivered only to the rear larger wheels of the tractor. Such tractors find application on farms located throughout the United States and are primarily designed for small wet land or irrigated farms having 500 acres or less. These tractors are designed to minimize costs while at the same time providing maximum power.

Unfortunately, such tractors find limited application in the large dry land areas existing in Montana, North Dakota, South Dakota, and the like. Such dry land farms are generally much larger than 500 acres often exceeding 5,000 acres in size. In order to profitably work such farms, an extremely large tractor is required having enormous fuel capacity and power. Such tractors are generally of bifurcated frame design having the front wheels mounted on a front section pivotally coupled to a rear section containing the rear wheels. Furthermore, such vehicles are generally four-wheel drive. One manufacturer of such prior art approaches is Harmon's Northern Mfg., Inc. of Havre, Montana, the assignee of the present invention. While such large tractors have been suitable for several years, various improvements have been made to overcome some disadvantages therein. While the improved features of the following invention are preferably disclosed for the BIG BUD series of tractors made by Harmon's Northern Mfg., Inc, such improvements may find application on a variety of tractors.

One problem in prior art four-wheel drive tractors is that of front wheel slippage under load conditions. The drawn implement provides a downward torque on the rear hitch of the tractor which in turn provides an upward force on the front wheels. This upward force upon the front wheels may cause slippage and ineffective power delivery to the front wheels. To overcome this slippage, the improved tractor of the present invention provides a new and novel storage area for the hydraulic fluid which is designed to wrap around the radiator of the tractor at the extreme front end and is further designed to act as a bumper for the tractor. Not only does the additional weight of the storage container and the hydraulic fluid provide a sufficient counteracting force to eliminate the slippage problem, but the provision of a wrap-around storage tank at the front of the tractor, which is generally the coolest part of the tractor, provides effective cooling of the hydraulic fluid in six different directions.

Another problem directly concerning the operator of such large tractors is that of dust and hot air. Some prior art approaches have substantially alleviated this problem by providing an enclosed cab around the operator and further by providing an air conditioner for cooling the air therein. Unfortunately, such prior art approaches generally aggrevate the discomfort of the operator since the air conditioning is generally too cold and too unilaterally directed (i.e., in the form of a draft), onto the body of the operator. The improved tractor of the present invention provides a new and improved air conditioning system which utilizes two separate air conditioners. The first air conditioner is mounted near the top front of the tractor cab while the second air conditioner is mounted on the top rear of the cab. Both air conditioners direct cooled and filtered air into a region between the top of the cab and a dome-shaped roof above the head of the operator. The dome-shaped roof has a plurality of holes drilled therein for directing the cooled air downwardly in a uniform pattern over the entire upper surface of the cab. No draft of cold air is delivered onto the operator.

Another problem of bifurcated tractors having cabs that are tiltable in nature is the placing or orientation of the hydraulic controls. The improved tractor of the present invention offers a simple and unique solution to that problem by incorporating the hydraulic control cables into the pedestal of the chair and by further delivering the cables through an arcuate upwardly extending portion terminating in an arm rest with the hydraulic controls disposed at the front of the arm rest. As the pedestal chair slides along a linear track or is pivoted in an angular relationship, the hydraulic controls are also so oriented. Furthermore, the hydraulic controls terminate in a hydraulic control box which is mounted upon the frame of the tractor and not onto the interior or the exterior cab portion as is done in prior art approaches. This provision substantially eliminates control noises eminating from the box from being delivered to the interior of the cab. Another problem of bifurcated prior art tractor designs has been the lack of perfect tracking of the rear wheels in the track of the front wheels during a turn or the like. The present invention eliminates this prior art problem by providing the center of the rear wheels to be the same distance from the coupler as the center of the front wheels. If this relationship is followed, then the rear wheels will perfect track in the track of the front wheels.

Finally, in the event that the tractor is used in wet environments, such as those found in Australia, mud balls are often formed between the outer surface of the tire and the inner surface of the fender thereby causing gumming or complete stoppage of the tractor. The improved tractor of the present invention substantially eliminates formation of mud balls between the fender and the outer surface of the wheel.

OBJECTS OF THE INVENTION

It is an object of this invention to provide new and useful improvements to a tractor.

It is a further object of the present invention to provide a new and improved tractor having an air conditioned cab over the operator wherein air is cooled and delivered uniformly through the roof of the cab and downwardly over the operator.

It is another object of the present invention to provide a new and improved tractor having an air conditioned cab wherein a first air intake is provided at the top front of the cab, a first air conditioner is receptive of the air from the first intake, a second air intake is provided at the rear of the cab, and a second air conditioner is receptive of the air from the second intake for delivering cold air in cooperation from the cool air from the first conditioner downwardly through a dome-shaped roof formed above the operator in which a plurality of downwardly directed holes are formed so that the cool air from the first and second air conditioners is uniformly distributed over said operator.

It is a further object of the present invention to provide a new and improved tractor having a pedestal chair for the operator of the tractor wherein the hydraulic cables are delivered from beneath the cab up through the pedestal of the chair and through an arcuate support upwardly extending from the pedestal and terminating in an arm rest and a series of hydraulic control levers disposed at the front of the arm rest.

It is a further object of the present invention to provide the above-stated pedestal chair with the upwardly extending arcuate support terminating in an arm rest which permits hydraulic cables to pivot and to slide with the chair in a plurality of orientations.

It is a further object of the present invention to provide a new and improved tractor having a front section and a rear section that is pivotally coupled together so that the distance between the coupler to the rear center of the rear wheel equals the distance from the coupler to the center of the front wheels so that the rear wheels perfectly track in the track left by the front wheels.

It is a further object of the present invention to provide a new and improved tractor wherein a specially designed hydraulic fluid storage tank is provided that wraps around the rear of the tractor and extends forwardly therefrom. The additional weight provided prevents the front wheels from slipping and the design further increases cooling of the hydraulic oil.

It is still another object of the present invention to provide a new and improved tractor having specially designed fenders to substantially eliminate the formation of mud balls therein.

It is still a further object of the present invention to provide a new and improved four-wheel bifurcated frame tractor having all of the above espoused features.

Other objects, advantages and capabilities of the present invention will become more apparent as the description proceeds taken in conjunction with the accompanying drawings.

SUMMARY OF THE INVENTION

The improved tractor of the present invention incorporates a new and novel air conditioning system, a new and novel hydraulic control system mounted to the pedestal chair, a new and novel means for storing hydraulic fluid at the front of the tractor for increased cooling as well as increased traction of the front wheels, and a more balanced tractor that results in perfect tracking.

The air conditioning system of the present invention comprises a front air conditioner which receives filtered air in the top front portion of the cab, cools that air and delivers it through a plurality of holes formed in a dome-shaped roof downwardly over the operator of the tractor. A second air conditioner is provided at the top rear portion of the cab, also cools the air and delivers that air through the same dome-shaped roof for delivery downwardly in a uniform distribution pattern over the operator of the tractor. In the preferred embodiment, the rear air conditioner operates with greater velocity than the front air conditioner.

The pedestal chair of the present invention has an arcuate upstanding portion that provides an arm rest to the right of the operator seated in the chair. The arcuate portion has a pedestal or hollow to permit conveyance of the hydraulic cables to a control box having control levers disposed at the extreme front portion of the arm rest. The chair is designed so that as the operator pivots in the chair or slides the chair along a linear track, the hydraulic controls are always in the same position in relation to the operator seated in the chair.

The front bumper of the tractor is wrapped around the radiator and is hollow to form the storage reservoir for the hydraulic fluid. Provision of the hydraulic fluid at the extreme front of the tractor provides greater weight distribution to substantially prevent front wheel slippage while at the same time maximizing air cooling of the hydraulic fluid.

The tractor has perfect tracking due to the unique relationship of the front wheels and the rear wheels to the coupler. In order to achieve perfect tracking, the distance between the coupler and the center line of the front wheels and from the coupler to the center line of the rear wheels must be equal.

DESCRIPTION OF THE DRAWINGS

FIG. 1 is a perspective view of the improved bifurcated tractor of the present invention.

FIG. 2 is a cross-sectional view of the tiltable cab of the present invention showing the air conditioning system and the pivotal pedestal chair.

FIG. 3 is a perspective view with a partial cut-away illustrating the dome-shaped roof of the present invention.

FIG. 4 is a perspective view with cut-aways showing the pedestal chair of the present invention having the upwardly extending arcuate control section.

FIG. 9 is a perspective view of the details of the construction of the hydraulic storage tank of the present invention.

FIG. 10 is a side planar view of the improved tractor of the present invention illustrating the various vectors of force developed as the tractor pulls an implement.

FIG. 11 is a partial perspective illustrating the rear section of the tractor showing the hitch.

FIG. 12 is a side planar view of one wheel and one fender illustrating the specific distance relationships of the present invention.

DETAILED SPECIFICATION

Figure 6:
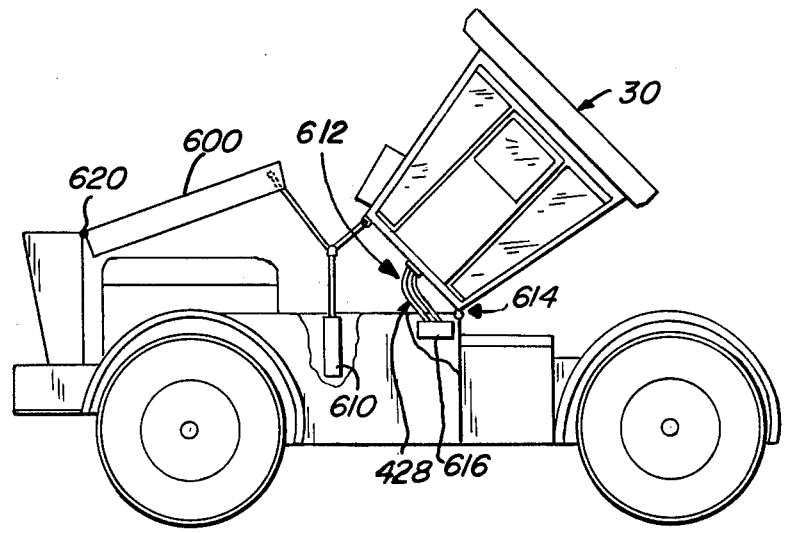
FIG. 6 is a side planar view of the improved tractor of the present invention with the hood and tiltable cab portion upwardly extended.

The improved tractor 10 of the present invention is shown in FIG. 1 to include the main tractor body 20 comprising a front pivotal section 22 and a rear pivotal section 24. Disposed on the front pivotal section is a tiltable cab 30.

The following new and novel features for tractor 10 are provided. A front mounted storage tank 40 for hydraulic fluid functions to place additional weight at the front end of the tractor while providing an area of increased cooling for the hydraulic fluid. The power plant or motor 50 of the present invention is mounted upon a removable skid so that the motor can be quickly removed from the interior of the tractor for servicing and maintenance. The fenders 60 are designed to minimize the build-up of mud from the terrain. An air conditioning system 70 is provided on the tiltable cab 30 to more evenly and uniformly distribute air conditioned air into the interior of the cab. A swivel chair 80 is provided to allow pivotal as well as front to rear track movement of not only the chair but also the hydraulic controls. Full length tinted glass windows 90 are provided to give the operator of the tractor 10 greater visibility of the tractor and the implements as well as the field. Finally, the draw bar 100 to which the implement attaches, is moved in closer to the rear wheel axle in order to provide better weight distribution for the tractor.

In all other aspects, tractor 10 of the present invention uses conventional components. A preferred embodiment of the tractor 10 of the present invention would include, for example, a Cummins NTC855 engine, a Fuller RTO-12513 transmission, a Clark 70500 Planatory Drive axle, a Spicer Angle Spring Type 12 ½ − 2 plate Clutch, a fuel tank of 525 gallons, a weight of 40,000 lbs. dry, dual 24 ½ × 32 tires, and a B.F. Goodrich balloon-type brake. A preferred height of the tractor is 13 ft. with a wheel base of 141 inches.

In FIG. 2 is shown in greater detail the air conditioning system 70 and the swivel chair 80 of the present invention. The cab 30 is substantially angular on the front and rear sides as indicated. Such angular relationships enable the user sitting in the chair 80 to have greater visibility of both the tractor and the implement. Mounted on the top of the cab 30 is the air conditioning arrangement 70 of the present invention.

The air conditioning arrangement 70 of the present invention includes inwardly directed air intakes 200 and 202 having disposed therein air filters 204. Disposed beneath the top roof 206 is a dome-shaped barrier 210 detailed in FIG. 3 to have an upper support portion 212 of rigid construction such as fiberboard or the like and a lower sound-absorbing portion 214 such as carpeting or the like. The sound absorbing material 214 is firmly affixed to the dome-shaped support 212 and a plurality of holes 216 are drilled through both the support 212 and the sound-absorbing portion 214. Disposed between the air intake 200 and 202 and the barrier 210, are two air conditioning units 220 and 222. The air conditioning units 220 and 222 are conventional and commercially available. It is to be noted, however, that the rear air conditioning unit 222 is operated at a speed somewhat greater than the speed of the front air conditioner 220. A preferred ratio of speed is that the rear conditioner 222 operates ⅓ faster than the front air conditioner 220. The reason for the speed difference is shown in FIG. 2 graphically with directional arrows 224. Of course, the dome-shaped roof can be used with either the front or rear conditioners alone to uniformly distribute the air.

The raw exterior atmospheric air is delivered into the intakes 200 and 202 through filters 204. The filtered air is then delivered into the air conditioning units 200 and 222 and is cooled and is directed in the space between the top of the cab 206 and the upper surface of the support material 212. The air is then forced through the preformed holes 216 and into the interior of the cab as represented by the arrows 224. Due to the fact that the rear air conditioners 222 delivers air at a greater velocity, the rear is delivered through the holes 216 and is biased in a forward flow pattern towards the front of the cab 30. It is to be noted, that the conditioned air emanating from the holes 216 is substantially uniformly distributed throughout the upper surface of the cab thereby eliminating drafts or the like in or around the operator of the cab sitting in the swivel chair 80. The air conditioned air is delivered downwardly in the direction of arrows 224 and outwardly through a rear vent 240 disposed at the bottom rear of the cab 30. The rear vent 240 can be any commercially louvered vent system. In this manner, air conditioned air flows evenly and thoroughly through the interior of the cab 30 without causing drafts in or around the operator. Of course, the filters 204 must be cleaned in order to remove dust build-up that commonly occurs in field use. Not shown are conventional controls for controlling both the temperature and the velocity of the conditioned air 224 in the interior of the cab 30.

The improved swivel chair 80 of the present invention is shown in FIGS. 2 and 4 to include the chair proper 400 having a back 404 and a bottom 408. The chair is mounted upon a pedestal support 410 to which is connected the hydraulics 420. The controls 422 of the hydraulics are mounted on an arm rest 424 which in turn is mounted upon a pedestal 426. The pedestal 426 is hollow and contains the hydraulic cables 428. The interior of the chair pedestal 410 is also hollow to permit delivery of the hydraulic cables 428 through the floor 430 of the cab 30 into the area beneath the cab 30.

The arm rest 424 is designed to be substantially rectangular in shape undergoing an arcuate portion 432 at the corner of the arm rest 424 nearest the operator. Disposed along the longitudinal edge 434 furtherest from the operator is an upstanding side support 436. Upstanding support 436 in cooperation with the arm rest 424 enables the user to place the forearm portion of his arm below the elbow on arm rest 424 so that his hand is in a position to rapidly activate controls 422 without tiring of his arm. The support 436 provides for a positive engagement with the forearm of the operator. The controls 422 are situated at the forefront of the arm rest 424 in a conventional housing 438 so that the cables 428 can access the control box 438 through appropriately formed holes, not shown, in arm rest 424.

The hydraulic control pedestal 426 is shaped in an arcuate fashion so that the controls 422 are appropriately and properly situated near the right hand of the operator and further that the pedestal 426 does not interfere with the leg of the operator.

Figure 5:
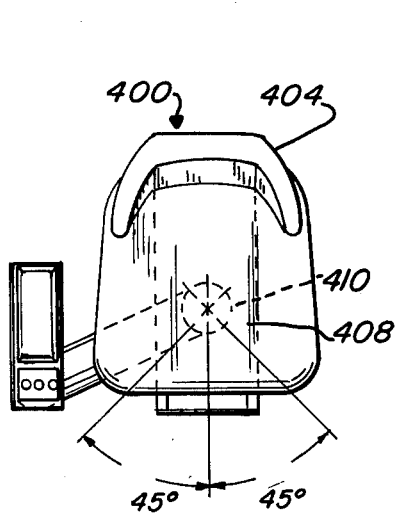
FIG. 5 is a top view of the pedestal chair of the present invention showing the pivotal orientations.

The chair 400 is mounted on a sliding track 450 which enables the chair 400 to move forwardly or rearwardly in the cab 30 at the discretion of the operator. The operator can lock the chair 400 into position by activating lever 452. The chair 400 as shown in FIG. 5 can pivot between 45° from the left to 45° to the right.

In FIG. 6 is shown the tiltable cab 30 and the hood 600 of the tractor being extended upwardly by cylinder 610 so that the motor and drive train can be easily accessed. In this orientation, the tiltable cab 30 is pivoted rearwardly to eliminate biasing of the hydraulic cables 428, the cables 428 from the chair are delivered underneath the tiltable cab 30 with sufficient slack 612 so that as the chair is slidably disposed in the track, in any of a number of plurality of positions, the cab 30 when tilted rearwardly pivots about point 614, the cables 428 do not crimp. The cables 428 enter a hydraulic fluid control center 616 located somewhat to the front of the pivot point 614. In this manner, the tiltable cab 30 can be tilted upwardly and rearwardly in such a fashion that the hydraulic cables 428 do not crimp or bias. Prior art approaches mounted the control box 616 onto the undersurface of the cab 30 wherein during operation of the hydraulics, noise was generated into the interior of the cab. By mounting the control box 616 on the frame, significant noise reduction is achieved.

The hydraulics 610 for pivoting the hood 600 upwardly about point 620 and for pivoting the cab upwardly and rearwardly about pivot point 614 is substantially disposed between hood 600 and cab 30.

Figure 7:
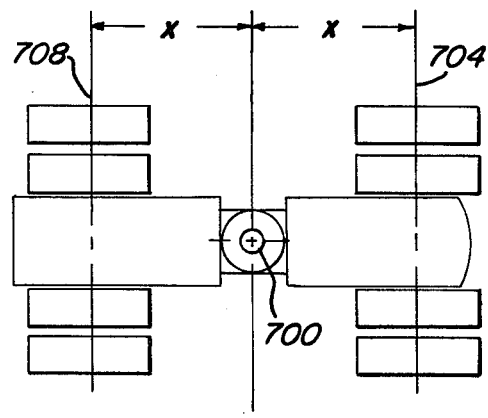
FIG. 7 is a diagrammatic illustration showing the relationship between the wheel centers and the pivotal connection of the tractor.
Figure 8:
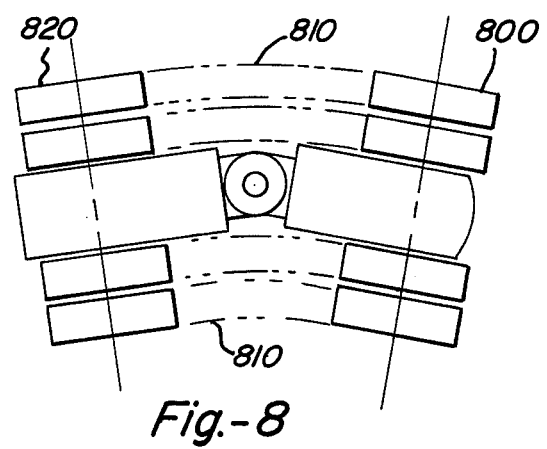
FIG. 8 is a diagrammatic representation of FIG. 7 illustrating the perfect tracking of the improved tractor of the present invention.

In FIGS. 7 and 8 is illustrated yet another feature of the present invention wherein the two sections front and rear of the tractor pivot about point 700. By maintaining the center line of the rear axle 704 equally distant from point 700 as the center line of the front axle 708, the rear wheels 800, as shown in FIG. 8, track in the path 810 of the front wheels 820. This provision permits packing of the terrain to occur only in the pathways 810 and avoids the problem of additional terrain packing.

The improved hydraulic fluid tank 40 of the present invention is shown in FIG. 9 to have a front storage section 900 and two opposing side storage sections 910 and 920. The storage portions 900, 910 and 920 are in fluid communication with each other. Fluid intake is received from connection 940 and fluid returned is found at 930. The hydraulic fluid tank 40 of the present invention is designed to wrap around the radiator of the tractor and the radiator is designed to fit in space 950. The hydraulic tank is manufactured from thick metal and is preferably welded into the configuration as shown in FIG. 9. Support braces 960 are added to lend further support to the tank. Of course, a cover 970 is welded over the top of the tank. The tank significantly improves the cooling of the hydraulic oil since heat can be generated from the hot oil in six directions as graphically shown by arrows 980.

The hydraulic fluid tank 40 serves another important purpose as shown in FIG. 10. The additional weight of the tank plus the stored hydraulic fluid extending forwardly from the front of the tractor causes an additional force vector 1000 directed towards the terrain as illustrated. This force vector 1000 substantially eliminates a problem inherent in conventional tractors. The front wheels 820 are independently driven and when pulling an implement at the hitch, a downward force vector is directed at the hitch as shown by vector 1002 about the center line 704 of the rear wheels 800. This in turn causes an upward force at the axle of the front wheels 820 as indicated by vector 1004. Since the front wheels 820 are independently driven, this upward force 1004 generated while drawing the implement, causes the front wheels 820 to slip on the terrain. Thus, necessary traction is often lost. The provision of the front hydraulic tank provides sufficient weight to balance the tractor so that traction on wheels 820 and 800 are substantially equal during the towing or drawing of an implement. Furthermore, the draw bar 1100 as shown in FIG. 11 is disposed as inwardly from the edge 1110 of the rear fender as possible thereby being disposed as close to the axle 704 of the rear wheels as possible. This minimizes the leverage as indicated by line 1010 in FIG. 10. This arrangement coupled with the provision of the hydraulic fluid tank provides for a better balanced tractor while drawing an implement.

A further feature of the present invention includes the fender and wheel arrangement of FIG. 12 in which the fender is designed in the following proportions. The distance between the outer surface of the tire 1200 and the front 1210 of the fender is y, the distance between the upper surface of the tire 1200 and the top 1220 of the fender is z, and the difference between the outer surface of the tire 1200 and the rear 1230 of the fender is x. If the following relationship is maintained, x is less than y is less than z, then the build-up of mud beneath the fender and the tire 1200 is greatly minimized. Mud balls are substantially prevented. Furthermore, the rear end 1230 of the fender can be slightly bent in as indicated by bend 1240 to act as a mud scraper to scrape mud off as the wheel turns in the direction as indicated by arrow 1250.

Although the present invention has been described with a certain degree of particularity, it is understood that the present disclosure has been made by way of example and that changes in details of structure may be made without departing from the spirit thereof.

I claim:

1. An improvement to a tractor having an air conditioned cab over the operator, said improvement comprising:
    means for cooling the air in said cab, and
    a dome-shaped roof formed under the top of said cab, said roof having a plurality of downwardly directed holes formed in uniform distribution therein, said holes being receptive of said cooled air from said cooling means for uniformly directing said air through the roof of said cab and downwardly over said operator.

2. The improvement of claim 1 in which said cooling means comprises:
    a first air intake at the front of said cab,
    a first air conditioner receptive of said air from said first air intake for cooling said air,
    a second air intake at the rear of said cab, and
    a second air conditioner receptive of the air from said second intake.

3. The improvement of claim 1 in which said second air conditioner delivers air at a greater rate than said first air conditioner.

4. The improvement of claim 1 in which said dome-shaped roof has sound absorbing material on the surface nearest the operator.

5. The improvement of claim 1 in which said first and second air intakes have filters disposed therein, said filters being capable of removing dust from said air.

6. An improvement to a tractor having an air conditioned cab over the operator, said improvement comprising:
    a first air intake at the front of said cab,
    a first air conditioner receptive of said air from said first air intake for cooling said air,
    a second air intake at the rear of said cab,
    a second air conditioner receptive of the air from said second intake,
    a dome-shaped roof formed under the top of said cab, said roof having a plurality of downwardly directed holes formed in uniform distribution therein, said holes being receptive of air from said first and second air conditioners for delivering said air over said operator,
    said second air conditioner delivering air at a greater rate than said first air conditioner,
    said dome-shaped roof having sound absorbing material on the surface nearest the operator, and
    said first and second air intakes having filters disposed therein, said filters being capable of removing dust from said air.

7. An improvement to a tractor having a chair mounted on a pedestal for use by the operator of said tractor, said pedestal being operatively interconnected with the floor of said tractor, said improvement comprising:
- means attached to said pedestal for delivering hydraulic cables through said floor and through the center of said pedestal,
- an arm rest connected to said pedestal and capable of carrying said cables, said arm rest being disposed to one side of said chair,
- hydraulic control levers mounted on the front of said arm rest receptive of said cables,
- means connected to said pedestal and said floor for pivoting said pedestal, said chair and said arm rest about pedestal, and
- means connected to said pedestal for selectively positioning said pedestal, said chair and said arm rest along a linear track disposed in said floor.

8. An improvement to a tractor having an air conditioned cab and a chair mounted on a pedestal disposed therein for seating the operator of said tractor, said improvement comprising:
- a first air intake at the front of said cab,
- a first air conditioner receptive of said air from said first air intake for cooling said air,
- a second air intake at the rear of said cab,
- a second air conditioner receptive of the air from said second intake,
- a dome-shaped roof formed under the top of said cab, said roof having a plurality of downwardly directed holes formed in uniform distribution therein, said holes being receptive of air from said first and second air conditioners for delivering said air over said operator,
- means attached to said pedestal for delivering hydraulic cables through said floor and through the center of said pedestal,
- an arm rest connected to said pedestal and capable of carrying said cables, said arm rest being disposed to one side of said chair,
- hydraulic control levers mounted on the front of said arm rest receptive of said cables,
- means connected to said pedestal and said floor for pivoting said pedestal, said chair and said arm rest about said pedestal, and
- means connected to said pedestal for selectively positioning said pedestal, said chair and said arm rest along a linear track disposed in said floor.

9. The improvement of claim 8 in which said second air conditioner delivers air at a greater rate than said first air conditioner.

10. An improvement to a four-wheel drive tractor, said improvement comprising means mounted on the extreme front of said tractor for storing of hydraulic fluid, the weight of said storing means with said hydraulic fluid being capable of substantially inhibiting slippage of the front wheel, said storing means comprising:
(a) a first storing area located in front of the radiator of said tractor,
(b) a second storing area located on the left of said radiator and in fluid communication with said first area, and
(c) a third storing area located on the right of said radiator and in fluid communication with said first area, said first, second and third areas being of sufficient strength to serve as the bumper of said tractor.

11. An improvement to a tractor, said tractor having a front section pivotally connected to a rear section, said front section having a radiator, front wheels, and a tiltable cab, said tiltable cab having a pedestal chair, said rear section having rear wheels and a hitch for connecting to an implement, said improvement comprising:
- means mounted on the extreme front of said tractor for storing of hydraulic fluid, the weight of said storing means with said hydraulic fluid being capable of substantially inhibiting slippage of the front wheels,
- a front section, said front section having said motor, said cab and said front wheels,
- a rear section, said rear section having said rear wheels,
- a coupler for connecting said front section to said rear section, the distance from the center of said front wheels to said coupler being equal to the distance from said coupler to the center of said rear wheels,
- means for cooling the air in said cab,
- means receptive of said cooled air for uniformly directing said air through the roof of said cab and downwardly over said operator,
- means attached to said pedestal for delivering hydraulic cables through said pedestal,
- an arm rest supported by said pedestal to one side of said chair,
- hydraulic control levers mounted on the front of said arm rest receptive of said cables,
- means connected to said chair for pivoting said chair and said arm rest about said pedestal, and
- means connected to said chair for selectively positioning said chair and said arm rest along a linear track.

12. The improvement of claim 11 in which said storing means comprises:
- a first storing area located in front of the radiator of said tractor,
- a second storing area located on the left of said radiator and in fluid communication with said first area, and
- a third storing area located on the right of said radiator and in fluid communication with said first area, said first, second and third areas being of sufficient strength to serve as the bumper of said tractor.

13. The improvement of claim 11 in which said cooling means comprises:
- a first air intake at the front of said cab,
- a first air conditioner receptive of said air from said first air intake for cooling said air,
- a second air intake at the rear of said cab, and
- a second air conditioner receptive of the air from said second intake.

14. The improvement of claim 13 in which said directing means further comprises a dome-shaped roof formed under the top of said cab, said roof having a plurality of downwardly directed holes formed in uniform distribution therein, said holes being receptive of said from said first and second air conditioners for channeling said air over said operator.

15. The improvement of claim 14 in which said second air conditioner delivers air at a greater rate than said first air conditioner.

16. The improvement of claim 14 in which said dome-shaped roof has sound absorbing material on the surface nearest the operator.

17. The improvement of claim 14 in which said first and second air intakes have filters disposed therein, said filters being capable of removing dust from said air.

18. The improvement of claim 11 further comprising fenders over said wheels, said fenders comprising:

the front portion of said fender being spaced y inches from the surface of the tire, the top portion of said fender being spaced z inches from said surface of said tire, and the rear portion of said fender being spaced x inches from said surface of said tire, said x inches being less than said y inches and said y inches being less than said z inches.

19. An improvement to a tractor, said tractor having a front section pivotally connected to a rear section, said front section having a radiator, front wheels, and a tiltable cab, said tiltable cab having a pedestal chair, said rear section having rear wheels and a hitch for connecting to an implement, said improvement comprising:

a first air intake at the front of said cab, a first air conditioner receptive of said air from said first air intake for cooling said air, a second air intake at the rear of said cab, a second air conditioner receptive of the air from said second intake, a dome-shaped roof formed under the top of said cab, said roof having a plurality of downwardly directed holes formed in uniform distribution therein, said holes being receptive of air from said first and second air conditioners for channeling said air over said operator, said second air conditioner delivering air at a greater rate than said first air conditioner, said dome-shaped roof having sound absorbing material on the surface nearest the operator, said first and second air intakes having filters disposed therein, said filters being capable of removing dust from said air, means attached to said pedestal for delivering hydraulic cables through said pedestal, an arm rest supported by said pedestal to one side of said chair, hydraulic control levers mounted on the front of said arm rest receptive of said cables, means connected to said chair for pivoting said chair and said arm rest about said pedestal, means connected to said chair for selectively positioning said chair and said arm rest along a linear track, a coupler for connecting said front section to said rear section, the distance from the center of said front wheels to said coupler being equal to the distance from said coupler to the center of said rear wheels, and means mounted on the extreme front of said tractor for storing of hydraulic fluid, the weight of said storing means with said hydraulic fluid being capable of substantially inhibiting slippage of the front wheels.

20. The improvement of claim 19 in which said storing means comprises:

a first storing area located in front of the radiator of said tractor, a second storing area located on the left of said radiator and in fluid communication with said first area, and a third storing area located on the right of said radiator and in fluid communication with said first area, said first, second and third areas being of sufficient strength to serve as the bumper of said tractor.

21. The improvement of claim 19 further comprising fenders over said wheels, said fenders comprising:

the front portion of said fender being spaced y inches from the surface of the tire, the top portion of said fender being spaced z inches from said surface of said tire, and the rear portion of said fender being spaced x inches from said surface of said tire, said x inches being less than said y inches and said y inches being less than said z inches.

* * * * *